US012658376B2

(12) United States Patent
Furukawa et al.

(10) Patent No.: US 12,658,376 B2
(45) Date of Patent: Jun. 16, 2026

(54) SOLID ELECTROLYTIC CAPACITOR

(71) Applicant: Panasonic Intellectual Property Management Co., Ltd., Osaka (JP)

(72) Inventors: Takeshi Furukawa, Saga (JP); Takayuki Matsumoto, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 18/700,943

(22) PCT Filed: Oct. 12, 2022

(86) PCT No.: PCT/JP2022/038077
§ 371 (c)(1),
(2) Date: Apr. 12, 2024

(87) PCT Pub. No.: WO2023/074375
PCT Pub. Date: May 4, 2023

(65) Prior Publication Data
US 2024/0412927 A1     Dec. 12, 2024

(30) Foreign Application Priority Data

Oct. 28, 2021     (JP) ................................. 2021-176281

(51) Int. Cl.
*H01G 9/08*          (2006.01)
*H01G 9/012*         (2006.01)
*H01G 9/15*          (2006.01)
(52) U.S. Cl.
CPC ............... *H01G 9/08* (2013.01); *H01G 9/012* (2013.01); *H01G 9/15* (2013.01)

(58) Field of Classification Search
None
See application file for complete search history.

(56) References Cited

U.S. PATENT DOCUMENTS

2006/0012946 A1* 1/2006 Ishida ...................... H01G 2/06
                                                                361/523
2006/0126273 A1* 6/2006 Ishijima ................. H01G 2/065
                                                                361/540
(Continued)

FOREIGN PATENT DOCUMENTS

CN          1812027 A  *  8/2006
CN          102683027 A  *  9/2012  ............... H01G 9/10
(Continued)

OTHER PUBLICATIONS

International Search Report of PCT application No. PCT/JP2022/038077 dated Dec. 20, 2022.

*Primary Examiner* — Dion R. Ferguson
(74) *Attorney, Agent, or Firm* — WHDA, LLP

(57) ABSTRACT

A solid electrolyte capacitor includes at least one capacitor element including an anode part and a cathode part, an anode terminal electrically connected to the anode part, a cathode terminal electrically connected to the cathode part, and an outer packaging resin covering the at least one capacitor element, the anode terminal, and the cathode terminal. Each of the anode terminal and the cathode terminal includes an exposed part that is exposed from the outer packaging resin. The outer packaging resin includes a mounting surface and four side surfaces each intersecting the mounting surface. The exposed part of each of the anode terminal and the cathode terminal includes a first part disposed along the mounting surface, and the first part includes a hollow part that opens toward an outside of the outer packaging resin.

7 Claims, 2 Drawing Sheets

(56)　　　　　　References Cited

U.S. PATENT DOCUMENTS

| | | | |
|---|---|---|---|
| 2007/0242409 A1* | 10/2007 | Nakamura ............. | H01G 9/012 |
| | | | 361/272 |
| 2013/0111720 A1* | 5/2013 | Ihara ..................... | H01G 9/012 |
| | | | 29/25.41 |
| 2014/0307365 A1* | 10/2014 | Chiu ....................... | H01G 9/15 |
| | | | 29/25.03 |
| 2015/0077904 A1* | 3/2015 | Kwak .................. | H01G 9/0029 |
| | | | 29/25.03 |
| 2016/0093447 A1* | 3/2016 | Kato ....................... | H01G 9/10 |
| | | | 361/540 |
| 2016/0343512 A1* | 11/2016 | Chiu ..................... | H01G 9/008 |
| 2018/0108493 A1* | 4/2018 | Lin ..................... | H01G 9/0029 |
| 2020/0176192 A1* | 6/2020 | Yamada ................. | H01G 9/012 |
| 2024/0006128 A1* | 1/2024 | Matsumoto ............. | H01G 9/10 |
| 2024/0412927 A1* | 12/2024 | Furukawa ............. | H01G 9/052 |

FOREIGN PATENT DOCUMENTS

| | | | | | |
|---|---|---|---|---|---|
| CN | 101996769 B | * | 4/2016 | ............. | H01G 9/012 |
| CN | 102436938 B | * | 4/2016 | .............. | H01G 9/15 |
| CN | 205959782 | | 2/2017 | | |
| JP | 01-089723 U | | 6/1989 | | |
| JP | 09-092575 | | 4/1997 | | |
| JP | 2004349270 | * | 12/2004 | .......... | H05K 3/3442 |
| JP | 2005-101418 | | 4/2005 | | |
| JP | 2005101418 A | * | 4/2005 | | |
| JP | 3806818 B2 | * | 8/2006 | | |
| JP | 2007096021 A | * | 4/2007 | | |
| JP | 2009-238776 | | 10/2009 | | |
| KR | 20120010176 A | * | 2/2012 | .............. | H01G 9/15 |

* cited by examiner

SOLID ELECTROLYTIC CAPACITOR

TECHNICAL FIELD

The present disclosure relates to a solid electrolytic capacitor.

BACKGROUND

There has been conventionally known a solid electrolytic capacitor including a capacitor element having an anode part and a cathode part, an anode terminal electrically connected to the anode part, a cathode terminal electrically connected to the cathode part, and an outer packaging resin covering these components (e.g., Unexamined Japanese Patent Publication No. H09-92575). As illustrated in FIG. 2 of Unexamined Japanese Patent Publication No. H09-92575, the solid electrolytic capacitor of Unexamined Japanese Patent Publication No. H09-92575 includes the anode terminal and the cathode terminal each of which provided with a cutout hole, and the outer packaging resin provided with a protrusion that is fitted into the cutout hole.

SUMMARY

An aspect of the present disclosure relates to a solid electrolytic capacitor. The solid electrolytic capacitor includes: at least one capacitor element including an anode part and a cathode part; an anode terminal electrically connected to the anode part; a cathode terminal electrically connected to the cathode part; and an outer packaging resin covering the capacitor element, the anode terminal, and the cathode terminal. Each of the anode terminal and the cathode terminal includes an exposed part that is exposed from the outer packaging resin. The outer packaging resin includes a mounting surface and four side surfaces each intersecting the mounting surface. The exposed part of each of the anode terminal and the cathode terminal includes a first part disposed along the mounting surface, and the first part includes a hollow part that opens toward an outside of the outer packaging resin.

The present disclosure enables improvement in quality of substrate mounting of the solid electrolytic capacitor by soldering.

DESCRIPTION OF EMBODIMENT

Figure 1A:
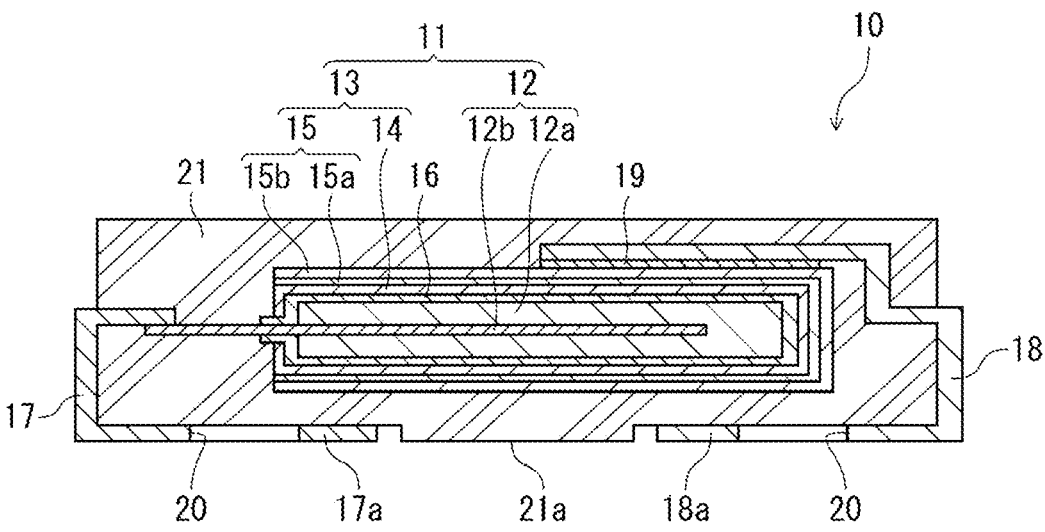
FIG. 1A is a sectional view schematically illustrating a solid electrolytic capacitor according to a first exemplary embodiment of the present disclosure.

Prior to description of exemplary embodiments, a problem in the prior art will be briefly described below.

Solid electrolytic capacitors are usually mounted on substrates by soldering. However, large amount of solder may cause molten solder to flow out around an anode terminal and a cathode terminal, so that a solid electrolytic capacitor may be inclined or floated by the solder having flowed out. As described above, when a solid electrolytic capacitor is mounted on a substrate by soldering, mounting quality may be impaired. In view of the above problems, the present disclosure improve quality of substrate mounting of the solid electrolytic capacitor by soldering.

Exemplary embodiments of a solid electrolytic capacitor according to the present disclosure will be described below with reference to examples. The present disclosure is not limited to the examples described below. Although specific numerical values and materials may be provided as examples in the description below, other numerical values and materials may be applied as long as the effects of the present disclosure can be obtained.

The solid electrolytic capacitor according to the present disclosure includes at least one capacitor element, an anode terminal, a cathode terminal, and an outer packaging resin.

The at least one capacitor element includes an anode part and a cathode part. The anode part may include an anode body and an anode wire. The anode body may be a porous sintered body obtained by sintering particles of a valve metal or the like. The anode wire may be formed of a conductive wire. The cathode part may include a solid electrolyte layer covering at least a part of a dielectric layer formed on a surface of the anode body, and a cathode layer covering at least a part of the solid electrolyte layer.

The anode terminal is electrically connected to the anode part. The anode terminal may be made of a conductive material (e.g., metal). The anode terminal may be bonded to an anode wire provided in the anode part.

The cathode terminal is electrically connected to the cathode part. The cathode terminal may be made of a conductive material (e.g., metal). The cathode terminal may be bonded to the cathode layer of the cathode part with a conductive adhesive interposed therebetween, for example.

The outer packaging resin is formed covering the capacitor element, the anode terminal, and the cathode terminal in a state where a part of each of the anode terminal and the cathode terminal is exposed. The outer packaging resin may be made of an insulating resin containing a filler. The outer packaging resin includes a mounting surface and four side surfaces each intersecting the mounting surface. The mounting surface of the outer packaging resin faces a member (such as a circuit board) on which the solid electrolytic capacitor is mounted. The anode terminal has an exposed part that functions as an anode external terminal of the solid electrolytic capacitor. The cathode terminal has an exposed part that functions as a cathode external terminal of the solid electrolytic capacitor.

The exposed part of each of anode terminal and the cathode terminal includes a part (referred to below as a first part) disposed along the mounting surface, and the first part includes a hollow part that opens toward an outside of the outer packaging resin (or toward the circuit board or the like). In other words, the hollow part opens toward the outside of the solid electrolytic capacitor. The hollow part defines a space between the first part and a member (such as a circuit board) to which the first part is connected. The hollow part has an outer periphery that may be closed in the first part. Alternatively, the hollow part may extend over an outer edge of the first part. When the hollow part extends over the outer edge of the first part, it can be said that the hollow part opens not only in a direction away from the mounting surface of the outer packaging resin (or in a direction toward the circuit board or the like) but also another direction. The another direction may be a direction toward the center (or a direction toward the inside) of the solid electrolytic capacitor, or may be a direction opposite to the direction toward the center (or a direction toward the outside) of the solid electrolytic capacitor. At least one hollow part may be formed in each of the anode terminal and the cathode terminal. The hollow part functions as a space for accommodating molten solder when the solid electrolytic capacitor is soldered to a substrate. The hollow part functioning as described above prevents solder from flowing out around the anode terminal and the cathode terminal, and thus enables improvement in quality of substrate mounting by soldering.

The outer edge of the hollow part may be away from the outer edge of the first part by a distance of 0.2 mm or more except for a part where the hollow part extends over the outer edge of the first part. This configuration enables sufficient bonding strength to be secured with a junction having a width of 0.2 mm or more when the solid electrolytic capacitor is soldered to the substrate.

The hollow part may be constituted by a hollow hole. In other words, the outer periphery of the hollow part may be closed in the first part. In this case, it can also be said that the hollow part opens only toward the outside of the outer packaging resin (or only toward the circuit board or the like). This configuration enables increase in bonding strength of the solid electrolytic capacitor to the substrate because the hollow part (hollow hole) is soldered over the entire circumference.

The hollow part may pass through each of the anode terminal and the cathode terminal in its thickness direction. In this case, the hollow part is formed with a depth equal to the thicknesses of each of the anode terminal and the cathode terminal. Thus, the hollow part is likely to sufficiently secure its volume, and thus is likely to sufficiently secure a space for accommodating molten solder.

The hollow part may not pass through each of the anode terminal and the cathode terminal in its thickness directions. In this case, the hollow part is formed as a recess having a bottom. Thus, when the capacitor element and each of the anode terminal and the cathode terminal are molded with the outer packaging resin, there is no possibility that a molten resin flows into the hollow part from the outer packaging resin regardless of a type of the solid electrolytic capacitor. The recess having the bottom may have a depth (or a distance between a surface of a terminal having the recess, the surface being farthest from the outer packaging resin, and the bottom), the depth being 30% or more of the thickness of the terminal, or 50% or more thereof, for example. It can also be said that the bottom is a ceiling part when viewed from the circuit board or the like.

The exposed part of the anode terminal may extend from a side surface to the mounting surface of the outer packaging resin, and may not be bonded to the outer packaging resin. The exposed part of the cathode terminal may extend from a side surface of the outer packaging resin to the mounting surface, and may not be bonded to the outer packaging resin. In this case, the solid electrolytic capacitor is configured as a so-called galwing-type solid electrolytic capacitor. For example, the exposed part of each of the anode terminal and the cathode terminal is bent toward the mounting surface at a boundary part with a side surface of the outer packaging resin, and is further bent at a boundary part between the side surface and the mounting surface to be disposed along the mounting surface. The solid electrolytic capacitor of this type includes the first part of each of the anode terminal and the cathode terminal, the first part being not in contact with the outer packaging resin in a process of molding each component with the outer packaging resin. Thus, there is no possibility that a molten resin flows into the hollow part regardless of a shape of the hollow part, so that the solid electrolytic capacitor of this type is particularly suitable for applying the technique of the present disclosure. However, the technique of the present disclosure is also applicable to solid electrolytic capacitors of other types.

A ratio of an area of the hollow part in an area of the part (first part) exposed along the mounting surface in each of the anode terminal and the cathode terminal is in a range from 10% to 50%, inclusive. For example, the ratio of the area of the hollow part formed in the anode terminal to the area of the first part of the anode terminal may be in a range from 10% to 50%, inclusive. This configuration enables both strength of the first part of each of the anode terminal and the cathode terminal and a space for accommodating molten solder to be sufficiently secured. When a plurality of hollow parts are formed in each of the anode terminal and the cathode terminal, the area of the hollow part refers to a total area of the plurality of hollow parts.

The anode part may include an anode body being porous and an anode wire partially embedded in the anode body. The anode terminal may be connected to the anode wire. The cathode part may include a solid electrolyte layer disposed on the anode body with a dielectric layer interposed therebetween.

As described above, the present disclosure enables improvement in mounting quality when a solid electrolytic capacitor is mounted on a substrate by soldering.

Hereinafter, an example of the solid electrolytic capacitor according to the present disclosure will be specifically described with reference to the drawings. The above-described components can be applied to components of a solid electrolytic capacitor as an example described below. The components of the solid electrolytic capacitor as the example described below can be changed based on the above description. The matters described below may be applied to the exemplary embodiment described above. The components of the solid electrolytic capacitor as the example described below include components that are not essential to the solid electrolytic capacitor according to the present disclosure and that may be eliminated Each drawing described below is schematic and does not accurately reflect a shape and the number of an actual member.

First Exemplary Embodiment

Figure 1B:
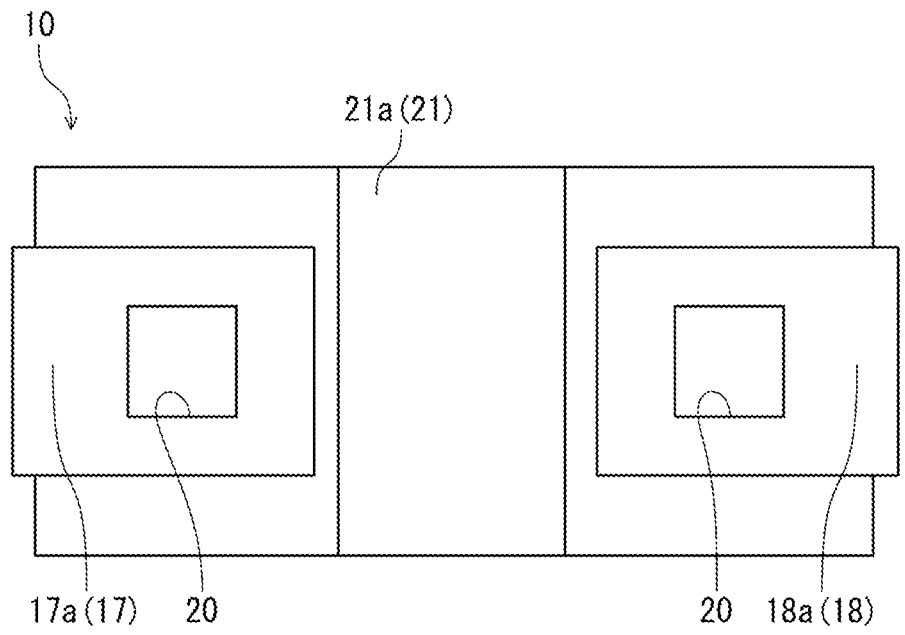
FIG. 1B is a bottom view schematically illustrating a solid electrolytic capacitor according to a first exemplary embodiment of the present disclosure.

A first exemplary embodiment of the present disclosure will be described. As illustrated in FIG. 1A and FIG. 1B, solid electrolytic capacitor 10 of the present exemplary embodiment includes capacitor element 11, anode terminal 17, cathode terminal 18, and outer packaging resin 21. Solid electrolytic capacitor 10 has a substantially hexahedral outer shape.

Capacitor element 11 includes anode part 12 and cathode part 13. Anode part 12 includes anode body 12a that is a hexahedral porous sintered body, for example, and anode wire 12b partially embedded in anode body 12a. Cathode part 13 includes solid electrolyte layer 14 formed on dielectric layer 16 formed on a surface of anode body 12a, and cathode layer 15 covering a part of a surface of solid electrolyte layer 14.

Anode body 12a is a porous sintered body obtained by sintering particles of metal such as a valve metal (referred to below as simply metal particles). As the metal particles, particles of valve metals such as titanium, tantalum, and niobium are used. One kind or two or more kinds of metal particles are used for anode body 12a. The metal particles may also be an alloy made of two or more kinds of metal. For example, a valve metal and an alloy containing silicon, vanadium, boron, or the like may be used. Alternatively, a compound containing a valve metal and a typical element such as nitrogen may be used. The alloy of the valve metal contains the valve metal as a main component, and preferably contains 50% or more the valve metal by atom.

Anode wire 12b is constituted by a conductive wire, for example. The material of anode wire 12b is not particularly limited, and examples of the material include copper, aluminum, and an aluminum alloy, in addition to the valve metal described above. The materials constituting anode body 12a and anode wire 12b may be identical in kind or different in kind. Anode wire 12b is not particularly limited in sectional shape, and may have a sectional shape such as a circular shape, a shape obtained by crushing a circular shape (a shape including straight lines parallel to each other and two curved lines connecting ends of these straight lines, and is referred to below as a track shape), an elliptical shape, a rectangular shape, or a polygonal shape. Among the above shapes, the track shape is preferable in that rolling is suppressed and positioning is easy during welding to anode terminal 17. Anode wire 12b has a diameter (a long diameter in the case of the track shape and the elliptical shape) that is also not particularly limited, and that is in a range from 0.1 mm to 1.0 mm.

Anode part 12 is produced by embedding a part of anode wire 12b in metal particles, for example, and by press-molding the metal particles in this state into the shape of a hexahedron (a rectangular parallelepiped in this example) and sintering the metal particles. As a result, a remnant of anode wire 12b is pulled out from a planting surface (left side surface in part (a) of FIG. 1A) of anode body 12a while being planted.

Dielectric layer 16 is formed on the surface of anode body 12a. For example, dielectric layer 16 is made of metal oxide. Examples of a method for forming a layer containing metal oxide on the surface of anode body 12a include a method for immersing anode body 12a in an anodizing solution to anodize the surface of anode body 12a, and a method for heating anode body 12a under the atmosphere containing oxygen. Dielectric layer 16 is not limited to a layer including the above metal oxide, and only need to have insulation properties.

Solid electrolyte layer 14 is formed covering at least a part of dielectric layer 16, and covering at least a part, preferably all, of the planting surface. This configuration enables expectation of increase in capacitance of solid electrolytic capacitor 10.

For solid electrolyte layer 14, for example, a manganese compound or a conductive polymer is used. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinylcarbazole, polyvinyl phenol, polypyridine, or derivatives of these polymers. These polymers may be used alone or in combination of a plurality of polymers. Alternatively, the conductive polymer may be a copolymer of two or more types of monomers. Among the conductive polymers, for example, polythiophene, polyaniline, and polypyrrole are preferable for their excellent electric conductivity. In particular, polypyrrole is preferable in terms of superiority in water-repellency.

Solid electrolyte layer 14 containing the conductive polymer above is formed by polymerizing a raw material monomer on dielectric layer 16 or applying a liquid containing the conductive polymer to dielectric layer 16, for example. Solid electrolyte layer 14 includes one or two or more solid electrolyte layers. When solid electrolyte layer 14 includes two or more layers, the conductive polymer used for each layer may be different in a composition, a forming method (polymerization method), or the like from each other.

Polypyrrole, polythiophene, polyfuran, polyaniline, and the like herein mean polymers having basic skeletons made of polypyrrole, polythiophene, polyfuran, polyaniline, and the like, respectively. Thus, polypyrrole, polythiophene, polyfuran, polyaniline, and the like each can also include its derivative. For example, polythiophene includes poly(3,4-ethylenedioxythiophene) and the like.

To improve electric conductivity of the conductive polymer, various dopants may be added to polymerization liquid for forming a conductive polymer, a conductive polymer solution, or a dispersion liquid. The dopant is not particularly limited, but examples include 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, trifluoromethanesulfonic acid, hydroxybenzenesulfonic acid, butylnaphthalenesulfonic acid, benzenesulfonic acid, polystyrenesulfonic acid, polyvinylsulfonic acid, and methanesulfonic acid, and derivatives of these dopants. Examples of the derivatives include metal salts such as lithium salts, potassium salts, and sodium salts, ammonium salts such as methylammonium salts, dimethylammonium salts, and trimethylammonium salts, piperidinium salts, pyrrolidinium salts, and pyrrolinium salts.

When the conductive polymer is dispersed in the dispersion medium in the form of particles, the particles preferably have mean particle diameter D50 in a range from 0.01 μm to 0.5 μm, for example. When mean particle diameter D50 of the particles is in this range, the particles are likely to enter the inside of anode body 12a.

Cathode layer 15 includes carbon layer 15a and metal (e.g., silver) paste layer 15b formed on a surface of carbon layer 15a. Carbon layer 15a is formed covering a part of solid electrolyte layer 14. Carbon layer 15a is constituted by a composition containing a conductive carbon material such as graphite. Metal paste layer 15b is constituted by a composition containing silver particles and a resin, for example. Cathode layer 15 is not limited to this configuration, and may be any configuration having a current collecting function.

Anode terminal 17 is electrically connected to anode part 12. Anode terminal 17 is electrically connected to anode body 12a using a part of anode wire 12b, the part protruding from anode body 12a. Anode terminal 17 is made of material that is not particularly limited as long as the material is electrochemically and chemically stable, and conductive. Thus, the material may be metal or nonmetal. Anode terminal 17 has a shape that is also not particularly limited, and has an elongated flat plate shape having a first principal surface and a second principal surface, for example. Anode terminal 17 in this case preferably has a thickness (distance between the principal surfaces of anode terminal 17) in a range from 25 μm to 200 μm, inclusive, and more preferably in a range from 25 μm to 100 μm, inclusive, from the viewpoint of height reduction.

Anode terminal 17 may be bonded to anode wire 12*b* with a conductive adhesive or solder, or may be bonded to anode wire 12*b* by resistance welding or laser welding. The conductive adhesive is a mixture of a thermosetting resin and carbon particles or metal particles, for example.

Cathode terminal 18 is electrically connected to cathode part 13. Cathode terminal 18 is electrically connected to cathode layer 15. Cathode terminal 18 is made of material that is also not particularly limited as long as the material is electrochemically and chemically stable, and conductive. Thus, the material may be metal or nonmetal. Anode terminal 17 has a shape that is also not particularly limited, and has an elongated flat plate shape having a first principal surface and a second principal surface, for example. Cathode terminal 18 in this case preferably has a thickness in a range from 25 μm to 200 μm, inclusive, and more preferably in a range from 25 μm to 100 μm, inclusive, from the viewpoint of height reduction. Cathode terminal 18 is bonded to cathode layer 15 with conductive adhesive 19 interposed therebetween, for example.

Outer packaging resin 21 is formed covering capacitor element 11, anode terminal 17, and cathode terminal 18 in a state where a part of each of anode terminal 17 and cathode terminal 18 is exposed. Outer packaging resin 21 includes mounting surface 21*a* (a lower surface in FIG. 1A) and four side surfaces intersecting mounting surface 21*a*. Outer packaging resin 21 is provided to electrically insulate anode terminal 17 from cathode terminal 18, and is made of an insulating material. Outer packaging resin 21 includes a cured product of a thermosetting resin, for example. Examples of the thermosetting resin include an epoxy resin, phenol resin, silicone resin, melamine resin, urea resin, alkyd resin, polyurethane, polyimide, and unsaturated polyester.

Outer packaging resin 21 is formed by a transfer molding method or a compression molding method, for example, in which the thermosetting resin and capacitor element 11 to which anode terminal 17 and cathode terminal 18 are connected are housed in a mold. At this time, capacitor element 11 is covered with outer packaging resin 21 while at least part of each of anode terminal 17 and cathode terminal 18 is led out from outer packaging resin 21. Outer packaging resin 21 has the outer shape of a rectangular parallelepiped. The at least part led out of each of anode terminal 17 and cathode terminal 18 (referred to below also as an exposed part) is bent along the outer shape of outer packaging resin 21, and disposed close to mounting surface 21*a* of outer packaging resin 21. The exposed part of each of anode terminal 17 and cathode terminal 18 extends from a side surface of outer packaging resin 21 to mounting surface 21*a*, and is not bonded to outer packaging resin 21.

Anode terminal 17 and cathode terminal 18 include parts (first parts 17*a*, 18*a*) exposed along mounting surface 21*a* of outer packaging resin 21, each of the parts being provided with hollow part 20 that opens toward a side opposite to outer packaging resin 21 (downward in FIG. 1A). As illustrated in FIG. 1B, hollow part 20 is in the shape of a square, but is not limited in shape, and may be in any other shape such as a circle, a rectangle, or an ellipse. Hollow part 20 of anode terminal 17 and hollow part 20 of cathode terminal 18 may be identical in shape and size to each other, or different in shape and size from each other.

Hollow part 20 is constituted by a hollow hole passing through corresponding one of anode terminal 17 and cathode terminal 18 in its thickness direction. That is, hollow part 20 of the present exemplary embodiment has a depth equal to a thickness of the corresponding one of anode terminal 17 and cathode terminal 18. Each of first parts 17*a*, 18*a* has a region used for soldering, the region having an angular O shape. Although a ratio of an area of hollow part 20 in an area of each of first parts 17*a*, 18*a* of anode terminal 17 and cathode terminal 18 is preferably in a range from 10% to 50%, inclusive, the ratio is not limited to this range. Hollow part 20 as described above may be formed by punching each of anode terminal 17 and cathode terminal 18, for example.

An outer edge of hollow part 20 is away from an outer edge of first part 17*a*, 18*a* by a distance of 0.2 mm or more. For example, a distance between a right end of first part 17*a* of anode terminal 17 and a right end of hollow part 20 of anode terminal 17 in an example illustrated in FIG. 1B may be 0.2 mm or more. Then, a distance between a left end of first part 18*a* of cathode terminal 18 and a left end of hollow part 20 of cathode terminal 18 in the example of the drawing may be 0.2 mm or more. This is because the distance between the outer edge of the hollow part 20 and the outer edge of first part 17*a*, 18*a* is minimized at corresponding one of these positions in the example illustrated.

Hollow part 20 functions as a space for accommodating molten solder when solid electrolytic capacitor 10 is soldered to a substrate (not illustrated). Hollow part 20 functioning as described above prevents solder from flowing out around anode terminal 17 and cathode terminal 18, and thus enables improvement in quality of substrate mounting by soldering.

Second Exemplary Embodiment

A second exemplary embodiment of the present disclosure will be described. Solid electrolytic capacitor 10 of the present exemplary embodiment is different from that of the first exemplary embodiment in configuration of hollow part 20. Hereinafter, the difference from the first exemplary embodiment will be mainly described.

Figure 2A:
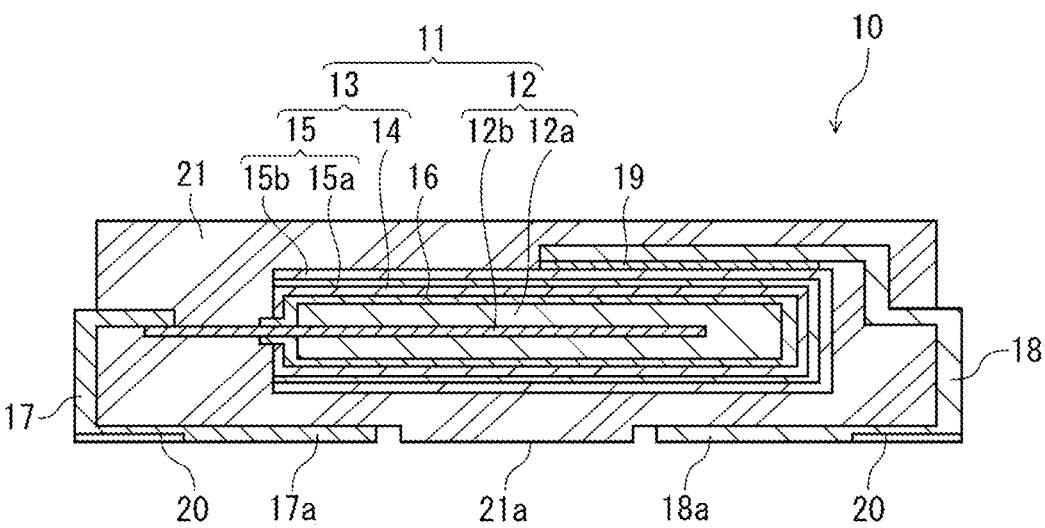
FIG. 2A is a sectional view schematically illustrating a solid electrolytic capacitor according to a second exemplary embodiment of the present disclosure.
Figure 2B:
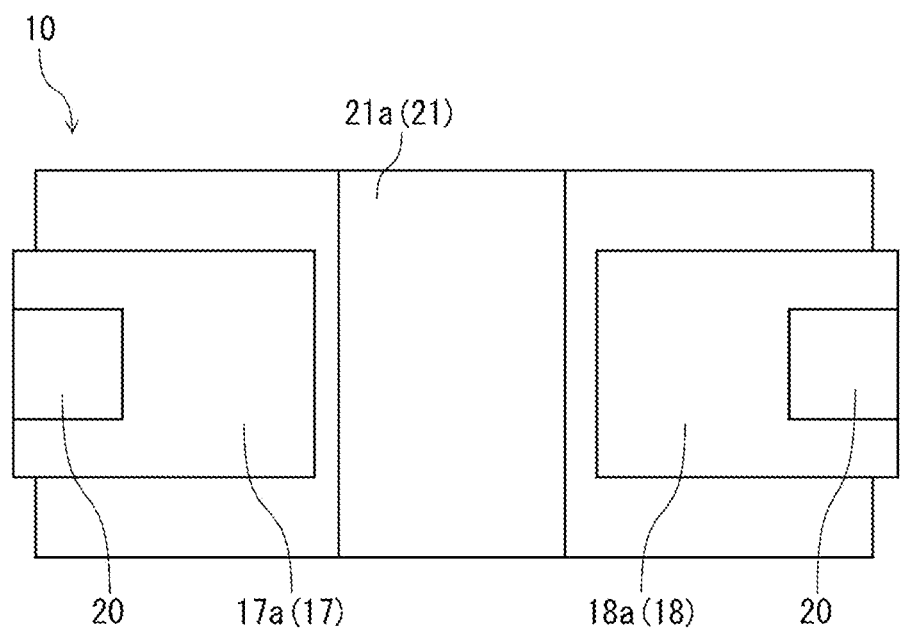
FIG. 2B is a bottom view schematically illustrating a solid electrolytic capacitor according to a second exemplary embodiment of the present disclosure.

As illustrated in FIG. 2A and FIG. 2B, hollow part 20 of the present exemplary embodiment is constituted by a recess formed in each of first parts 17*a*, 18*a* of anode terminal 17 and cathode terminal 18. That is, hollow part 20 does not pass through each of anode terminal 17 and cathode terminal 18 in its thickness direction. A depth of hollow part 20 may be in a range from 20% to 80%, inclusive, of the thickness of each of anode terminal 17 and cathode terminal 18, for example.

Hollow part 20 extends over the outer edge of first part 17*a*, 18*a*. Specifically, hollow part 20 of anode terminal 17 extends over a left edge of first part 17*a* of anode terminal 17 in an example illustrated in FIG. 2B. The example of the drawing shows hollow part 20 of cathode terminal 18, hollow part 20 extending over the right edge of first part 18*a* of cathode terminal 18. Each of first parts 17*a*, 18*a* has a region used for soldering, the region having an angular U shape.

The present disclosure can be used for a solid electrolytic capacitor.

The invention claimed is:
1. A solid electrolytic capacitor comprising:
at least one capacitor element including an anode part and a cathode part;
an anode terminal electrically connected to the anode part;
a cathode terminal electrically connected to the cathode part; and
an outer packaging resin covering the at least one capacitor element, the anode terminal, and the cathode terminal, wherein:

each of the anode terminal and the cathode terminal includes an exposed part that is exposed from the outer packaging resin, the outer packaging resin includes a mounting surface and four side surfaces, the four side surfaces each intersecting the mounting surface, the exposed part of each of the anode terminal and the cathode terminal includes a first part disposed along the mounting surface, the first part includes a hollow part that opens toward an outside of the outer packaging resin, and an outer periphery of the hollow part is closed in the first part.

2. The solid electrolytic capacitor according to claim 1, wherein:

the hollow part is constituted by a hollow hole, and the hollow hole opens only in a direction perpendicular to the mounting surface.

3. The solid electrolytic capacitor according to claim 1, wherein the hollow part passes through each of the anode terminal and the cathode terminal in a thickness direction of the each of the anode terminal and the cathode terminal.

4. The solid electrolytic capacitor according to claim 1, wherein the hollow part does not pass through each of the anode terminal and the cathode terminal in a thickness direction of the each of the anode terminal and the cathode terminal.

5. The solid electrolytic capacitor according to claim 1, wherein:

the exposed part of the anode terminal extends from corresponding one of the four side surfaces of the outer packaging resin to the mounting surface, and is not bonded to the outer packaging resin, and the exposed part of the cathode terminal extends from corresponding one of the four side surfaces of the outer packaging resin to the mounting surface, and is not bonded to the outer packaging resin.

6. The solid electrolytic capacitor according to claim 1, wherein a ratio of an area of the hollow part in an area of the first part is in a range from 10% to 50%, inclusive.

7. The solid electrolytic capacitor according to claim 1, wherein:

the anode part includes an anode body being porous and an anode wire partially embedded in the anode body, the anode terminal is connected to the anode wire, and the cathode part includes a solid electrolyte layer disposed on the anode body with a dielectric layer disposed between the solid electrolyte layer and the anode body.

* * * * *